D. F. GRAHAM.
ANTIFRICTION BEARING.
APPLICATION FILED JAN. 10, 1910.
1,105,132.
Patented July 28, 1914.
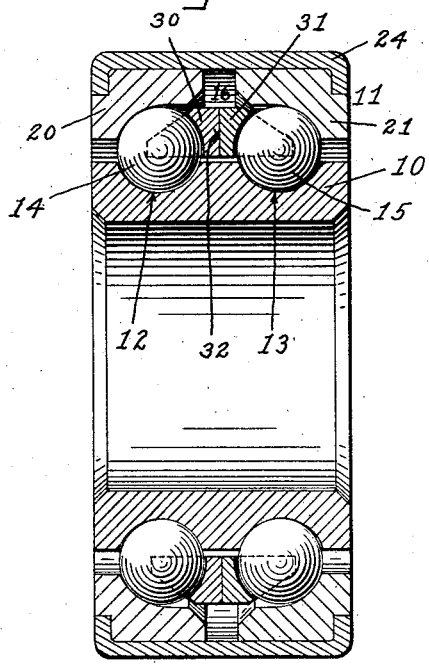
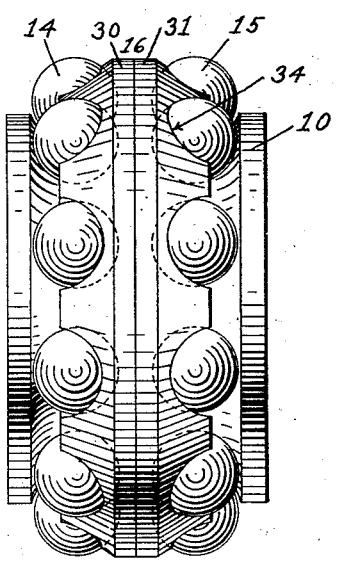
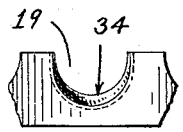
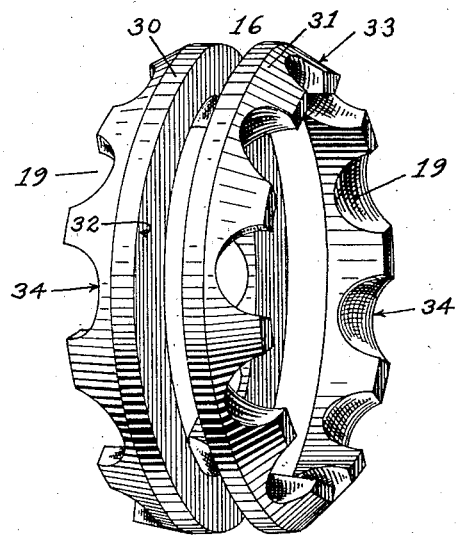
WITNESSES:
F. E. Potter.
INVENTOR:
David F. Graham,
BY
Gales F. Moore,
his ATTORNEY.

UNITED STATES PATENT OFFICE.

DAVID F. GRAHAM, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

ANTIFRICTION-BEARING.

1,105,132. Specification of Letters Patent. Patented July 28, 1914.

Application filed January 10, 1910. Serial No. 537,169.

*To all whom it may concern:*

Be it known that I, DAVID F. GRAHAM, a citizen of the United States, residing at Bristol, county of Hartford, State of Connecticut, have invented a certain new and useful Antifriction-Bearing, of which the following is a full, clear, and exact description, such as will enable others skilled in the art to which it appertains to make and use the same, reference being had to the accompanying drawings, forming part of this specification.

My invention relates to anti-friction bearings, and more particularly to the separator for the balls or other anti-friction-members of a bearing embodying two such rows. In so-called double row ball bearings it has been customary to employ a unitary separator having pockets or recesses in its opposite edges for receiving the balls of the respective rows. But in some instances this has proved unsatisfactory. It is practically impossible to produce races of exactly the same diameter for each row of balls. Therefore, it frequently happens that in a double row bearing one row of balls tends to travel faster than the other row, and the result is that the unitary separator engaged by both rows of balls is held back by engagement with the slower row while the balls of the faster row press against the separator in their effort to travel about the center of rotation of the bearing. The separator thus becomes jammed between the balls of the two rows and, consequently, interferes with the free rolling of the balls. Frequently the balls thus jammed wear away the pocket-walls of the separator, and in some instances the strain causes the separator to break.

My object is to provide a structure in which the balls of each row are held properly spaced or separated and yet each row can rotate independently of the other.

A further object is to provide a separator which permits the accomplishment of the object just above recited.

To these ends, and also to improve generally upon devices of the character indicated, my invention consists in the various matters hereinafter described and claimed.

In the accompanying drawings: Figure 1 is a sectional elevation of a bearing embodying my invention; Fig. 2 is an edge elevation with the outer bearing member removed; Fig. 3 is a fragmentary detail looking at the inner circumference of a separator-section; and Fig. 4 is a perspective view of the separator.

In said drawings, 10 represents the inner race-member, 11 the outer race-member, 14 and 15 the balls of the respective two rows between said race members, and 16 the separator. The inner race-member is illustrated as a sleeve having the circumferential ball grooves or races 12 and 13, while the outer race-member is shown as comprising the cup-rings 20 and 21 held together by the casing ring 24 to move as a single element.

The separator 16 is split and comprises the separate rings or separator-sections 30 and 31. Each of these separator-sections has recesses or pockets 19 in its outer edge to receive the balls of the appropriate row, and each said ring also has a relatively broad, flat inner face 32 which abuts against the corresponding face of the coöperating ring. Thus, each separator section can rotate independently of the other, so that each row of balls can rotate at its own speed without detriment to the other balls or to the separator. But, at the same time, the balls are properly spaced and separated and the separator-sections, abutting against each other and almost filling the space between the rows of balls, are securely held against wabbling and displacement.

Preferably each separator-section has a beveled outer face 33 and is thus of a generally triangular cross section so that the separator can be employed in a relatively small space and yet can present the desirable relatively broad abutting faces 32. Furthermore, I prefer to make the distance between the ball-confining outer edge 34 of each pocket and the edge of its coöperating race 12 or 13 slightly less than the diameter of the balls. Thus, upon the outer side of the center of a ball (*i. e.*, upon that side of the center opposite the inner portion of the race-member with which the separator particularly coöperates, here shown as the race-member 10), the said edge 34 of a pocket and the edge of its coöperating race are a distance from each other which is slightly less than the diameter of a ball, the balls being thus snapped into place in the pockets, and the inner race-member 10, the separator-sections 30 and 31 and the balls thus being held against accidental separation when these parts are assembled, this also preventing rattling of the balls in use. The pockets curve to conform to the general contour of the balls and thus serve to retain grease for lubricating the balls. Thus, by my present invention each row of balls of a double row bearing can rotate at its own speed without damage to the other balls or to the separator, and the separator is securely held against wabbling or other undesirable displacement, the separator occupying but small space.

Having thus described my invention, what I claim as new and desire to secure by Letters Patent is—

1. In an antifriction bearing embodying two rows of antifriction-members, a separator comprising independently movable sections of generally triangular cross-section, the relatively broad inner faces of the said sections abutting, and the said sections having pockets receiving said antifriction-members of the respective said rows; substantially as described.

2. In an antifriction bearing, a race-member having two races and a retaining wall coöperating with each of the same, a row of antifriction members in each of said races and coöperating with one of said retaining walls, and a separator comprising independently movable sections each of which has a retaining wall which coöperates with one of the first mentioned retaining walls and lies a distance from the same less than the diameter of the retained antifriction member, the bearing point of the antifriction member upon its race being upon one side of the center of said antifriction member and the line determined by the edges of said coöperating retaining walls being upon the opposite side of said center, said separator sections also having abutting bearing-faces, whereby said separator sections hold each other against lateral displacement and accidental displacement of the antifriction members is prevented; substantially as described.

3. A separator for antifriction bearings, said separator comprising independently movable sections each of which is substantially triangular in cross-section and has pockets for antifriction-members, the relatively broad faces of said sections abutting; substantially as described.

4. In an antifriction bearing, the combination with an inner and an outer bearing-member, each provided with a pair of raceways having opposed bearing-faces, and two rows of anti-friction members disposed in said raceways and in rolling contact with said opposed faces respectively, for holding said bearing-members against radial and longitudinal movement relative to each other, of a separator-section carried by each row of anti-friction members, both of said separator-sections being adapted for mutual guidance and loosely supporting each other in their movements with their respective anti-friction members.

5. In an anti-friction bearing, the combination with an inner and an outer bearing-member, each provided with a pair of raceways, having opposed bearing-faces, and two rows of anti-friction members disposed in said raceways and in rolling contact with said opposed faces respectively, for holding said bearing-members against radial and longitudinal movement relative to each other, of a unitary separator-section carried by each row of anti-friction members, both of said separator-sections being adapted for mutual guidance and loosely supporting each other in their movements with their respective anti-friction members.

6. In an anti-friction bearing, the combination with an inner and an outer bearing-member, each provided with a pair of raceways having opposed bearing-faces, and two rows of anti-friction members disposed in said raceways and in rolling contact with said opposed faces respectively, for holding said bearing-members against radial and longitudinal movement relative to each other, of a unitary separator-section carried by each row and partially enveloping each member of such row, both of said separator-sections being adapted for mutual guidance and loosely supporting each other in their movements with their respective anti-friction members.

7. The combination with an outer bearing-member having a pair of adjacent raceways provided with opposed bearing-faces, an inner bearing-member having a pair of adjacent raceways coöperative with the raceways of the first member and separated from each other by an annular web having adjacent bearing-faces, and independent sets of anti-friction devices in said raceways and in running contact with said bearing-faces, of independent separator-sections for said sets of devices respectively, said separator-sections being carried thereby concentrically with said web and contacting with their adjacent faces for mutual support, and each being adapted for rotative movement relatively to the other.

In testimony whereof, I hereunto affix my signature, in the presence of two witnesses.

DAVID F. GRAHAM.

Witnesses:
 GALES P. MOORE,
 ALICE E. BROWN.